United States Patent
Hurst et al.

(10) Patent No.: US 7,905,052 B2
(45) Date of Patent: Mar. 15, 2011

(54) SYSTEM OF PHOTOMORPHOGENICALLY ENHANCING PLANTS

(76) Inventors: William E. Hurst, Troy, MI (US);
Kenneth M. Morrow, Vallejo, CA (US)

( * ) Notice: Subject to any disclaimer, the term of this patent is extended or adjusted under 35 U.S.C. 154(b) by 242 days.

(21) Appl. No.: 11/943,018

(22) Filed: Nov. 20, 2007

(65) Prior Publication Data
US 2008/0298052 A1    Dec. 4, 2008

Related U.S. Application Data

(60) Provisional application No. 60/860,057, filed on Nov. 20, 2006.

(51) Int. Cl.
*A01G 13/02* (2006.01)
*A01G 9/14* (2006.01)
(52) U.S. Cl. ............................... 47/29.4; 47/17
(58) Field of Classification Search ................. 52/204.5; 47/17, 29.3, 58.1 LS
See application file for complete search history.

(56) References Cited

U.S. PATENT DOCUMENTS

| | | | |
|---|---|---|---|
| 4,734,830 A | 3/1988 | Cristian et al. | |
| 5,012,609 A * | 5/1991 | Ignatius et al. | 47/1.01 R |
| 5,095,414 A | 3/1992 | Tinus | |
| 6,118,216 A * | 9/2000 | Marlor | 313/636 |
| 6,602,275 B1 * | 8/2003 | Sullivan | 607/88 |
| 6,725,598 B2 * | 4/2004 | Yoneda et al. | 47/60 |
| 6,921,182 B2 * | 7/2005 | Anderson et al. | 362/231 |
| 6,956,243 B1 * | 10/2005 | Chin | 257/79 |
| 7,617,057 B2 * | 11/2009 | May et al. | 702/62 |
| 2003/0127506 A1 * | 7/2003 | Braun, Jr. | 232/31 |
| 2004/0065006 A1 * | 4/2004 | Weder | 47/17 |
| 2007/0289207 A1 * | 12/2007 | May et al. | 47/17 |
| 2008/0216399 A1 * | 9/2008 | Kiyohara et al. | 47/17 |

* cited by examiner

*Primary Examiner* — Rob Swiatek
*Assistant Examiner* — Kristen C Hayes
(74) *Attorney, Agent, or Firm* — Gifford Krass, Sprinkle, Anderson & Citkowski, P.C.

(57) ABSTRACT

A system for radiating plants with photon radiation to induce photomorphogenic growth is described. The system includes a light assembly operable to transmit photon radiation, a light transmittive material located between the light assembly and a plant, a power supply connected to the light assembly, a failsafe switch connected to and located between the power supply and the light assembly and a photomorphogenic growth controller connected to the light assembly. The power supply is operable to energize the light assembly and the failsafe switch is operable to de-energize the light assembly when a safety signal is received by the failsafe switch. The photomorphogenic growth controller is operable to selectively energize the light assembly.

18 Claims, 3 Drawing Sheets

SYSTEM OF PHOTOMORPHOGENICALLY ENHANCING PLANTS

CROSS-REFERENCE TO RELATED APPLICATIONS

This application is a non-provisional application that claims priority benefit of U.S. Provisional Application Ser. No. 60/860,057 filed Nov. 20, 2006, the contents of which are hereby incorporated by reference.

FIELD OF THE INVENTION

This invention relates in general to the areas of horticulture using artificial lighting systems to illuminate plants and in particular to using controlled ultraviolet (UV) light exposure in the course of plant growth.

BACKGROUND OF THE INVENTION

The visible light spectrum, known as photosynthetically active radiation (PAR), is of paramount importance in plant growth in that PAR light is responsible for driving photosynthesis. However, the role of ultraviolet radiation (UV) in promoting plant growth and survival is less well understood.

UV light itself is classified in three spectral regions: the ultraviolet A light (UVA) is of wavelengths of between 320 and 400 nm; ultraviolet B light (UVB) is of wavelengths between 280 and 320 nm; and ultraviolet C light (UVC) is of wavelengths between 180 and 280 nm. The ea is bathed in both UVA and UVB light. However, UVC light is almost entirely filtered out by the earth's atmosphere.

Ultraviolet light in the UVB range is higher energy than UVA and responsible for damage to cells and tissues particularly with exposure to low wavelength UVB light. UVB radiation effects on plants that are attributed to susceptibility to pests, for example, include DNA damage (Britt, A. B., *Trends Plant Sci,* 1999; 4:20-25), modification in gene expression (Savenstrand, H. et al., *Plant Cell Physiol,* 2002; 43:402-10; Brosche M. and Strid A., *Physiol Plant,* 2003; 117:1-10), changes in secondary metabolism (Feucht W. et al., *Vitis,* 1996; 35:113-18; Picman A., et al., *Verticillium albo-atrum Biochem Syst Ecol,* 1995; 23:683-93; Glassgen W. et al., *Planta,* 1998; 204:490-98; Norton, R., *J Agr Food Chem,* 1999; 47:1230-35; Wicklow D., et al., *Mycoscience,* 1998; 39:167-72), and changes in leaf anatomy, i.e. leaf thickness and cuticle thickness (Garcia S., et al., *Phyotochemistry,* 1997; 44:415-18; Liakoura, V., et al., *Tree Physiol,* 1999; 19:905-08; Raviv, M., and Antignus, Y., *Photochem Photobiol,* 2004; 79:219-26). Additionally, UVB light causes plants to produce UVB absorbing compounds, such as flavonoids and other phenolics, phenolpropenoids, alkaloids, and terpenoids. These secondary responses are generally independent of photosynthesis and produce photomorphogenic responses in UVB recipient plants.

Early experiments analyzing solar UVB effects demonstrated substantially reduced photosynthesis, plant growth, and crop yield. However, these early experiments were performed under unrealistic spectral balances in that high levels of UV were used. In experiments employing balanced levels of UV radiation, UV-induced partitioning of carbon to production of secondary plant metabolites occurs. Enhanced UVB radiation stimulates production of phenolics and flavonoids that serve a protective role by accumulating in leaf epidermal cells and attenuating UV radiation before encounters of sensitive processes in mesophilic cells. Synthesis of bulk methanol soluble UV absorbing compounds increases by 10% following enhanced UVB radiation.

Glasshouse manufacturers continue to claim that blocking UV radiation shows beneficial effects on reducing plant pathogens and insect pests. However, the presence of UV radiation, including high--energy UVB radiation, is actually beneficial to plant physiology and development. Indeed, when plants are subjected to UV light in addition to PAR many benefits are observed including insect and pathogen resistance and elevated levels of DNA repair capability. The reduced crop yields long thought to be the hallmark of increased ultraviolet light exposure, have recently been demonstrated to be inaccurate. The positive effects of UV radiation are not observed unless full spectrum light is present, including UVA, UVB, and photosynthetically active radiation. However, in radiation controlled studies in which UV and PAR are used simultaneously, high doses of UVB radiation relative to UVA causes some leaf damage in plants suggesting that the more unnatural the spectrum, the greater the damage caused by ultraviolet radiation. (Krizek, 1993; Caldwell, 1994.)

Gene expression is positively regulated by exposure to natural levels of ultraviolet radiation. As many as 70 UVB responsive plant genes have been identified that control mechanisms such as photosynthesis, pathogenesis, and the generation of antioxidants, Several processes regulated by UVB radiation are related to increased or enhanced plant color or fragrance. This modified genetic expression, translation, or modification pattern in the presence of UVB radiation partially explains why clones from the same plant grown in artificial lighting and sunlight look, taste and smell different than their genetic identicals grown in natural sunlight.

A majority of plants show significant benefit from ultraviolet light. Many of these are economically important plants such as herbs, drug producing plants, ornamental flowers, and food crops, Benefits of UV light include increased immune responses, enhanced pigmentation and aroma, and altered plant architecture such as shape, flower number and volume, and thricome density. A meta analysis of numerous plant species suggests that insect damage actually decreases with increasing doses of UVB light. (Bothwel, 1994; Mazza, 1999.) This response has been demonstrated in agricultural as well as in native plants. (Id.; Rousseaux, 1998.) For example, Isaguire, 2003 showed that expression of 20% of insect fighting genes of tobacco are increased after exposure to UVB radiation. These include proteinase inhibitors that inactivate insect digestive tract (Ryan, 1990) and furanocoumarin that results in slower development of insect larvae (McCloud, 1994). Production of insect repelling phenols is also observed following increased solar UVB radiation. (Fuglevand et al., 1996.) Defense to insects includes the formation of flavonoids or pigments that absorb UV in the 220 to 380 nanometer range. (Ormrod, 1995.) It is hypothesized that flavonoids and other chemicals produced in response to UV shield the plant by absorbing light in the UV range, inhibiting insect attachment and further scavenging free radicals.

Supplemental ultraviolet light on tomato plants produces a thickening of the skin that also increases resistance to insects such as boring insects. Other beneficial characteristics are simultaneously present such as the flavor of the pulp is considerably more complex and desirable. Fruit skin toughening is also found in naturally increased UV exposure. In analyses of plants in Tierra del Fuego on the southernmost tip of South America, which is regularly affected by severe ozone depletion increasing the levels of ultraviolet radiation exposure from the sun, insects prefer plant tissue before it is exposed to UVB light. (Ballaré, 2001.) An alternative hypothesis is that insects are refracted by the altered chemical production in leaves exposed to UVB light. In either case, UVB exposure is overall beneficial to plants, Enhanced pigmentation is seen in many species after exposure to UV light. This is an important observation in that commercially important dyes are produced in plants. (Gilbert and Cooke, 2001.) The synthesis of dyes may be increased by exposure of these plants to UVB or UVA light. Also, enhanced pigmentation of ornamental flowers, especially noted in blue, black and purple tones, is seen after exposure of these plants to UVB light. (Kevan, 2001.) The increase in pigmentation as well as flavonoid production are well documented in response to ultraviolet light. Increase in flavonoid compounds is attributed to the beneficial effects in fruit, vegetables, tea, and red wine grapes to name a few. A specific non-limiting example is the production of anthocyanin that is increased in response to ultraviolet light exposure. The presence of anthocyanin causes roses to appear red to blue depending on the pH in which they are grown. This is seen most often in the leaves of juvenile plants as a reddish hue which disappears as the new leaves mature. However, increased anthocyanin production requires high levels of photosynthetically active radiation alongside increased UV levels. (Steyn, 2002.) As such, a gardener growing roses will see this effect when both UV and photosynthetically active light are present in optimal conditions.

Aromatic oils are also enhanced by in output by ultraviolet light. Such oil output is increased in basil and mint, for example. (Johnson, 1999.) These essential oils are concentrated in glandular thricomes which appear to benefit significantly from UVB radiation.

Auxin levels which absorb UVB light are photo degraded by levels of UVB. However, ethylene which causes radial growth and less elongation in plants is increased after UVB irradiation in sunflower seedlings (Ross and Tevini, 1995) and pear seedlings (Predieri et al., 1993).

UV light exposure increases expression of many of the greater than 25,000 terpenoids known with many with diverse functions in plants. Anti-insecticidal activity is achieved by increased levels of pyrethin which is a natural insecticide (Harbourne, 1991). Beneficial insects may also be attracted by terpenoids such as pollinators and predatory wasps.

Alkaloids are found in 20% of flowering plants are enhanced by UV light. Greater than 12,000 different alkaloids are known in plants and may be economically important as pharmaceuticals including morphine, nicotine, caffeine and cocaine. They are also important as insecticides and other deterrents. Indeed nicotine from tobacco was one of the first insecticides deployed by humans. Phenolic compounds, which illustratively include coumarins, furanocoumarins, and flavonoids, are also produced in the presence of ultraviolet light. There are more than 4,500 flavonoids known. Many flavonoids are strongly colored and used by plants and flowers and fruits to promote pollination and seed dispersal. Thus, UV induced phenolic compounds increases the ornamental desirability of flowering plants or fruits.

Finally, plant shape, architecture, flower number, and thricomes are enhanced or affected by the presence of ultraviolet B radiation. For instance, both UVA and UVB inhibit stem elongation in a wide variety of plants. Decreased elongation is attributed to UV induced destruction of the plant hormone auxin, however increases in the hormone ethylene cause greater radial growth and less elongation, as has been seen in sunflower seedlings and pear seedlings. (Ros and Tevinin, 1995; Prediere, 1993.) These architectural effects may be exploited to improve handling and growing procedures for crops. For example, lower levels of stem elongation can allow for greater stacking capability within a single greenhouse or light irradiated structure increasing crop yield per unit area. Also, balanced light conditions consisting of PAR in addition to UV radiation produce an increase in flower numbers inside a glasshouse. (Grammatikopoulos, 1998; Day, 1999.) Increased diameter of the flowers is also achieved. (Petropoulou, 2001.) In general monocots are more responsive to increased levels of UVB in glasshouses illuminated as in the instant invention than are dicots. (Barnes, P., *Am J Bot,* 1990; 77:1354-60.)

These studies suggest that plants are improved in their yield or ornamental appearance by a proper balance between UV radiation and other light wavelengths. The problem is that high intensity bulbs are limited in the amount of ultraviolet radiation produced to approximately 3% of the total light output. (ANSI C78.38-2005) Therefore, given that UV light is both beneficial to photomorphogenic properties of plants and harmful if used improperly, there is a need for a process of irradiating plants using an artificial light source so as to improve the growth, appearance, disease resistance and desirability of the plants and their fruit.

SUMMARY OF THE INVENTION

A system for radiating plants with photon radiation to induce photomorphogenic growth is described. The system includes a light assembly operable to transmit photon radiation, a light transmittive material located between the light assembly and a plant, a power supply connected to the light assembly, a failsafe switch connected to and located between the power supply and the light assembly and a photomorphogenic growth controller connected to the light assembly. The power supply is operable to energize the light assembly and the failsafe switch is operable to de-energize the light assembly when a safety signal is received by the failsafe switch. The photomorphogenic growth controller is operable to selectively energize the light assembly.

The light assembly can be operable to transmit photon radiation in the form of ultraviolet, visible and/or infrared radiation. The safety signal received by the failsafe switch can originate from an electronic device, the electronic device being a motion detector, door position detector, window position detector, manual on/off switch, an emergency off switch and the like. The photomorphogenic growth controller selectively energizes the light assembly as a function of the plant growth cycle, the plant environment, a user input and/or a position of the light assembly relative to the plant. A control circuit can also be included within the system. In addition, a light assembly positioner that is operable to position the light assembly relative to the plant can be included. The light assembly positioner can position the light assembly relative to the plant as a function of the plant growth cycle and/or input datum such as user input, time of day, cumulative time of plant exposure to photon radiation from the light assembly, ambient light intensity and/or humidity level.

DETAILED DESCRIPTION OF THE PREFERRED EMBODIMENTS

Figure 1:
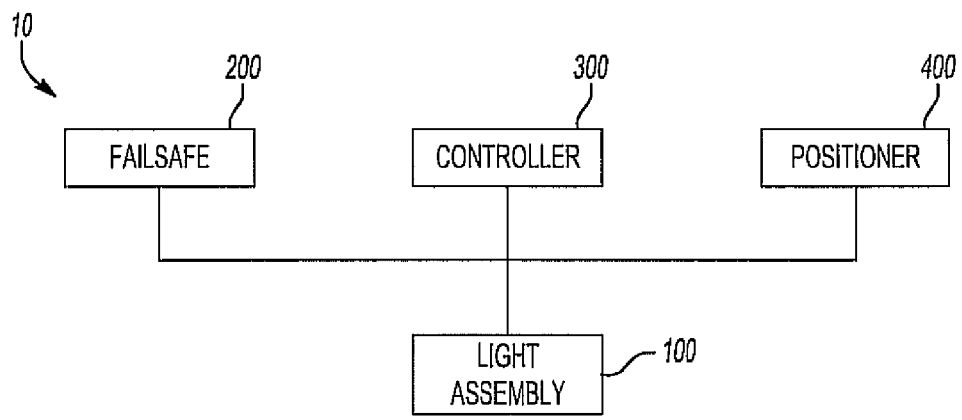
FIG. 1 is a block diagram schematic of a photomorphogenic growth system for an embodiment of the present invention.

The instant invention has utility in increasing the economic benefit, output and desirability of plants grown in artificial lighting conditions and to benefit such plants. The instant invention is generally related to a container, a glasshouse, or other system for the growing of plants or other crops.

According to the present invention, an artificial light source is oriented such that illumination is transmitted through a light transmissive material and subsequently contacts plants oriented on the opposite side of the transmissive material as the light source. A physical system suitable for use in the instant invention is optionally a wall structure constructed of light transmissive material that allows the passage of light sufficient to promote growth of the biological material stored in a reservoir defined by the wall structure itself. The structure can be a glasshouse or other greenhouse type structure, The glasshouse is optionally a small desktop container. It is appreciated that the glasshouse is of any suitable size for the intended use such as large scale crop production in fluid, soil or other solid media, or for a single plant as in a home growing situation. The glasshouse can be used for growing ornamental flowers or other home or commercial use plants suitable for a horticulture business.

It is desirable that the transmissibility of the wall material at selected light wavelengths is kept at a maximum. In some instances borosilicate glass is used as a transmissive material. Non-limiting examples of glass include borosilicate or flint glass, soda lime glass, and quartz. Preferably the light transmissive material not only allows passage of sunlight but is transparent to promote full passage of all light necessary to support growth including that in the UVB, UVA, photosynthetically active region, and infrared regions. Translucent materials are optionally used to screen out certain wavelengths or light intensities depending on factors and needs of the biological material or the need to reduce accumulation of heat in the structure.

The transmissive material can be a borosilicate glass with optical and physical properties including 60% to 70% by weight silicon dioxide, 10% to 15% by weight $B_2O_3$, 5% to 15% by weight $Na_2O$, 5% to 10% by weight $K_2O$, 0.1% to 1% by weight CaO, 0.5% to 3% by weight BaO, 0% to 5% by weight dilithium oxide, 0% to 2% titanium dioxide, 0% to 25% by weight ZnO, and 0% to 0.5% by weight $Sb_2O_3$, and normal refining agents. It is appreciated that the inclusion of oxides of Ti, Zn, or Sb are effective in limiting the amount of UVC transmitted while still passing a limited quantity of UVB needed to promote growth.

Borosilicate glass with a defined edge optical absorption is used as the wall structure. The edge situation or edge wavelength corresponds to half the pure transmission maximum value between the blocking and the permeable range. An illustrative example of an optical borosilicate glass operable in the instant invention is defined in U.S. patent application Ser. No. 11/835,491, which is incorporated herein by reference.

The light transmissive material has a transmissivity with a point of inflection between 280 and 320 nm and located in the UVB range so as to transmit the UVA and photosynthetically active visible wavelengths while limiting the amount of deleterious UVC transmitted to a plant. A point of inflection in the transmission spectrum as used herein is defined as a point where the double derivative spectrum is zero and bounded by non-zero values. A range for a spectral point of inflection can be between 285 and 310 nm. This sharp edge situation UVC cutoff achievable by varying the content of titanium dioxide or zinc oxide in the glass system. Borosilicate glass composed simply of normal refining agents contains high levels of transmissibility throughout the IR and visible spectrum with no UVA blockage, little UVB blockage, and total UVC blockage. Thus, doping of the glass with material such as titanium dioxide creates a desired steep edge situation at a desired wavelength.

In some instances the transmissive material has a steep cutoff at the desired UVB wavelength and the highest possible transmittance of light in the remaining range of the spectrum such as the UVA, visible, and infrared spectral regions. The material can have high temporal stability of the spectral transmission characteristics such that temporal transmittance is not altered over the course of time. Optionally, the glass is tempered. Additionally, material suitable in the instant invention optionally has high mechanical stability such that it can define a wall and can resist weathering conditions and the weight of material such as snow or resist damage from projectiles. Finally a material suitable in the instant invention is optionally available in large sheets such that construction of large glasshouses is easily obtainable. It is appreciated that large continuous films, liquid sprays or other treatments, are similarly suitable in the instant invention. Transmissive filtering materials are preferably able to withstand high intensity UVB radiation.

Borosilicate glass thickness used in an embodiment optionally regulates the level of transmittance. In a non-limiting example the thinner the glass material the more light is transmitted. In some instances the glass material allows transmission of greater than 50% of light with a wavelength at or above the edge situation. In other instances light transmission at or above the edge situation is between 90 and 95%. In still other instances the light transmission levels are greater than 95% at or above the edge situation with an optimal level of 98% or greater light transmission at or above the edge situation.

Glass materials as thin as 1 to 2 mm thick are the most beneficial in providing light transmissibility. A 1 mm thick borosilicate glass will block all UVB from a 1 watt lamp and virtually none from a 1000 watt lamp. Thus, the glass thickness is preferably chosen with relation to the intensity of the chosen light source, The borosilicate glass can be between 1 and 10 mm thick, or in the alternative between 2 and 5 mm thick. It is appreciated that glass with thickness parameters outside these preferred ranges is optionally employed in the instant invention.

Optionally multiple glass types, compositions, and thicknesses are combined in a single wall situation. For example, glass with greater thickness is optionally employed in regions of high light availability or where the structural integrity of the glasshouse is of paramount concern such as in geographic regions that receive large amounts of snow. Glasshouses suitable for use in the instant invention optionally contain thicker glass on some portions of the ceiling panel and thinner glass structures on other portions of the ceiling or wall. Illumination is optionally adjusted such that higher UV emitting lights are used on wall portions with thicker glass and lower energy UV light emitting bulbs are used where thinner of the glass is used. Optionally the glass panel is movable to rotate or otherwise alter position with adjusting solar light source position, In maximizing the strength of the structure and simultaneously reducing the amount of energy used, numerous illuminating sources are optionally employed in the instant invention such as sunlight or artificial sources. Artificial light sources optionally include high intensity discharge (HID) lights selected to emit visible light, ultraviolet radiation, and/or infrared radiation. Preferably, maximum UV radiation emitted from HID lamps is preserved by the chosen glass material. Fluorescent bulbs are optionally employed to selectively emit various wavelengths of ultraviolet radiation such as UVB-313 fluorescent lamps, as well as metal halide (MH) lamps or high pressure sodium (HPS) bulbs. Bulbs optionally employed include MH bulbs suitable for emitting wavelengths between 400 and 500 nm and used for increasing vegetative growth or HPS bulbs suitable for emission of longer wavelengths such as between 500 and 700 nm which are used for voluminous flower production. Lamps are optionally used individually or in combination to provide or supplement ultraviolet light. In an embodiment, the light transmissive material totally surrounds the lamp structure such that each lamp structure individually comprises an illuminating unit. In another embodiment the light source is oriented above or to the side of the biological material. Numerous illuminating units or illuminating sources are optionally employed depending on the required light intensity or spectral characteristics of the light to be illuminated on the biological material. Different light sources are optionally employed at different locations around the biological material. In a non-limiting example, the light sources are more UV emitting above the plant with less UV emitting light sources to the side of the plants to mimic the movement of the sun. Optionally, the light sources are varied at different locations in the glasshouse. In a non-limiting example, more intense UV emitting lights are placed overhead whereas lower emitting light sources are placed lower to the horizon. In the alternative, a single light source is positioned at various locations relative to the plants. Each of these light sources are optionally illuminated at different times to mimic movement of the sun.

The inventive process optionally alters stress responses or photomorphogenic properties of the biological material. The photomorphogenic properties altered by the chosen light spectrum are optionally defense mechanisms against a pathogen attack, increased levels of UV activating genes, modified gene expression, thickening fruit skin, altering fruit flavor characteristics, increased production of flavonoids, increased fungal resistance, enhancing pigmentation, increased pigment production, essential oil output, resin output, decreased stem elongation, increased radial growth of flowers, altering architectural properties, post harvestability, increases or decreases in flower numbers, increases in thricome density, decreases in leaf area, altering production of terpenoid, alkaloid, phenolpropanoid or other economically valuable compounds such as pharmaceutics.

Secondary metabolites produced by the altered photomorphogenic characteristics in the instant invention optionally include products such as dyes, polymers, fibers, glues, oils, waxes, flavors, perfumes, and drugs.

Turning now to FIG. 1, an embodiment of a system for radiating a plant with photon radiation to induce photomorphogenic growth is illustrated generally at reference numeral 10. The embodiment has a light assembly 100 with a failsafe switch 200, a photomorphogenic growth controller 300 and a positioner 400 in communication therewith. The failsafe switch 200 de-energizes the light assembly 100 in the event that a person is in the vicinity of the light assembly 100. Given that the light assembly 100 can be radiating a plant with ultraviolet light, such a failsafe switch is desirable to prevent human exposure. The photomorphogenic growth controller 300 selectively energizes the light assembly 100 such that controlled exposure of a plant by the light assembly 100 is afforded. In addition, the positioner 400 affords for the light assembly 100 to be placed at different locations relative to the plant.

Figure 2:
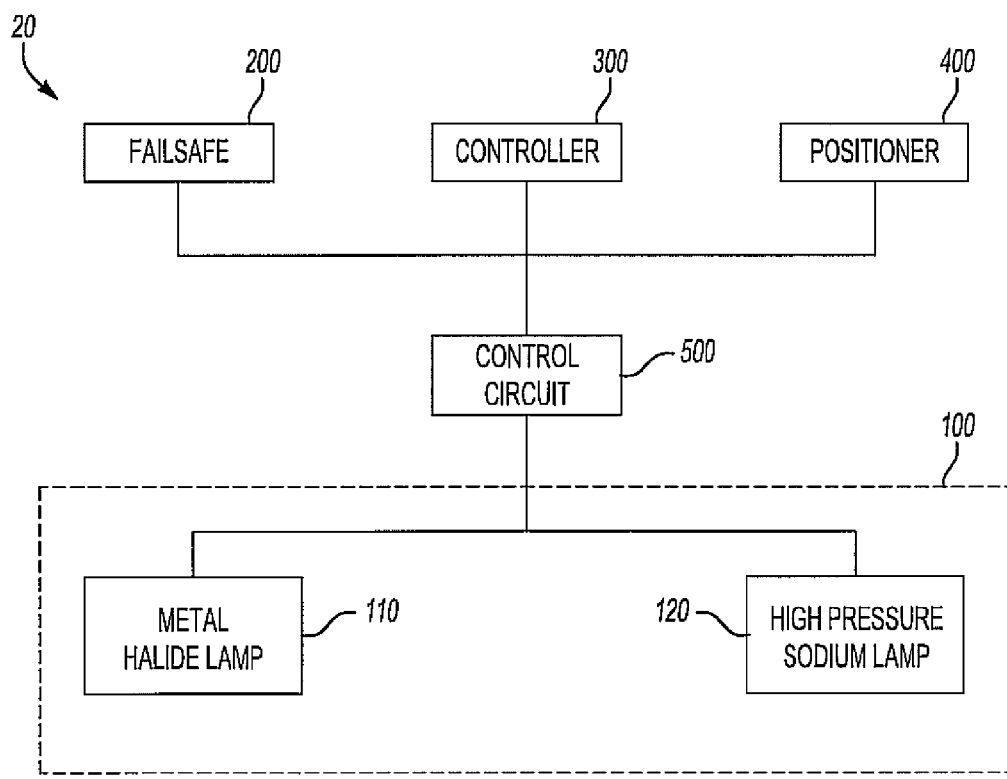
FIG. 2 is a block diagram schematic of a photomorphogenic growth alternate system for an embodiment of the present invention.

In some instances, an embodiment shown generally at reference numeral 20 in FIG. 2 includes a control circuit 500 in communication with the light assembly 100. The control circuit 500 affords for information from the failsafe 200, the photomorphogenic growth controller 300 and the positioner 400 to be used in relation to the light assembly 100. As illustrated in FIG. 2 for example purposes only, the light assembly 100 can include a metal halide lamp 110 and a high pressure sodium lamp 120.

Figure 3:
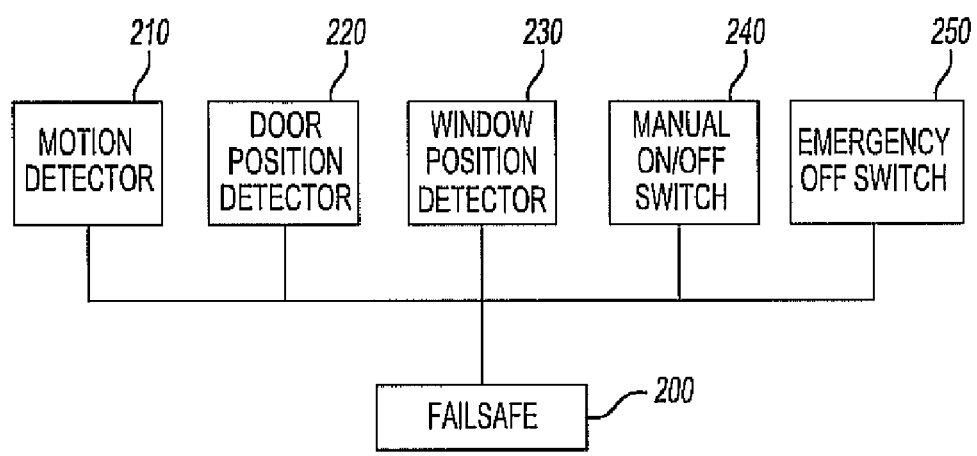
FIG. 3 is a schematic representation of input to a failsafe switch for an embodiment of the present invention.

The failsafe 200 can receive a safety signal from an electronic device and then subsequently de-energize the light assembly 100. For example, as illustrated in FIG. 3, the safety signal received by the failsafe switch 200 can originate from a motion detector 210, a door position detector 220, a window position detector 230, a manual on/off switch 240 and/or an emergency off switch 250. In this manner, if an individual enters an area in close vicinity of the light assembly 100 without de-energizing said assembly, the motion detector 210, door position detector 220 and/or window position detector 230 would afford for the safety signal to be transmitted and received by the failsafe switch 200. The failsafe switch 200 then de-energizes the light assembly 100 and provides a safety feature to the system.

Figure 4:
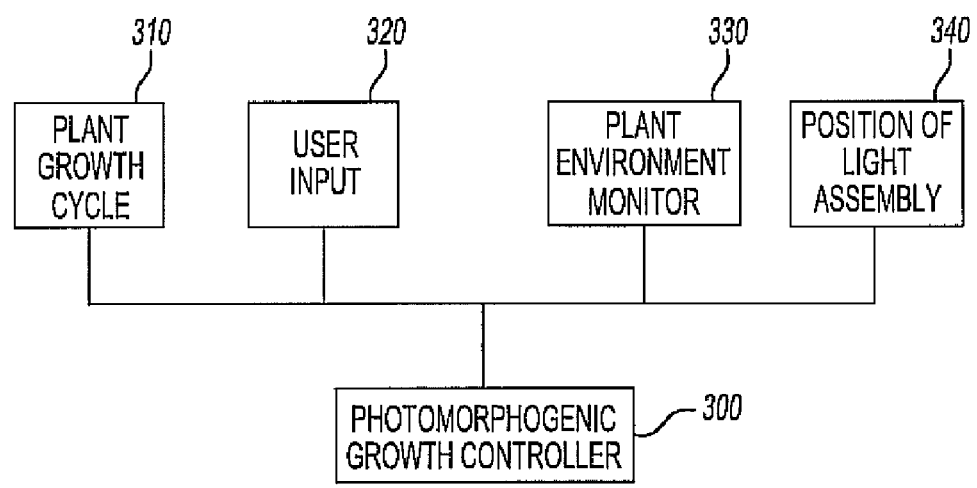
FIG. 4 is a schematic representation of input to a photomorphogenic growth controller of the for an embodiment present invention.
Figure 5:
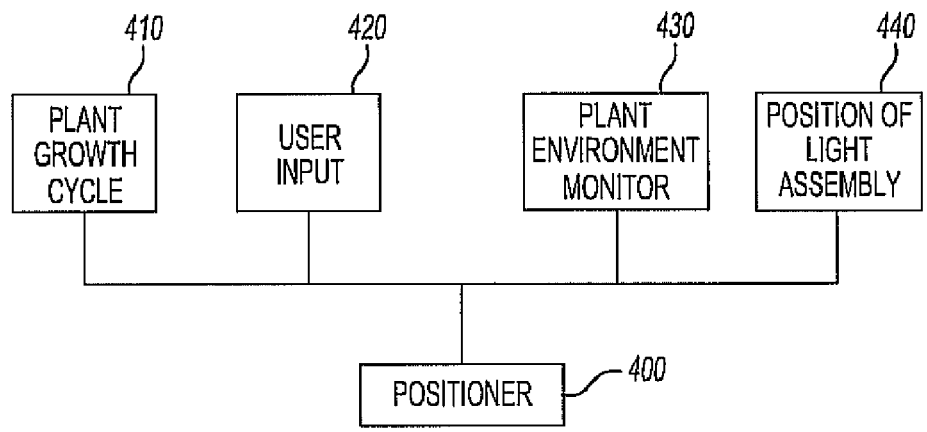
FIG. 5 is a schematic representation of input to a positioner for an embodiment of the present invention.

The photomorphogenic growth controller 300 as illustrated in FIG. 4 affords for the selective energizing of the light assembly 100. The photomorphogenic growth controller 300 can energize the light assembly 100 based on one or more criteria. For example, the photomorphogenic growth controller 300 can energize the light assembly 100 as a function of a plant growth cycle 310. Likewise, the photomorphogenic growth controller 300 can selectively energize the light assembly 100 based on input from a user 320, a plant environment monitor 330 and/or a position of the light assembly 340 relative to the plant. The plant environment monitor 330 can illustratively monitor, detect and signal such environmental parameters as ambient light intensity and humidity level. The input data is one of user input, time of day, cumulative time of plant exposure to photon radiation from said light assembly, ambient light intensity, humidity level, and combinations thereof. According to the present invention dosing a plant with an enhanced UVB at a particular portion of the circadian rhythm or portion of the growing season produces previously unknown improvements in plant growth and/or fruit quality. While a cotyledon is vulnerable to UVB exposure, it has been found that UVB exposure of a plant early in the day appears to modify plant perception of the time of year to speed growth. Without intending to be bound by a particular theory, UVB in sunlight is concentrated around noon on a given day (apex of solar day) and is maximal at summer solstice presumably because of atmospheric path absorption of ultraviolet light. By initiating UVB exposure earlier in a day relative to noon, growth is promoted. Additionally, UVB exposure of stalk and leaf underside through positioning the light assembly in an orientation where UVB photons move parallel or at an acute angle to the plant horizontal plane, growth is further enhanced for reasons that also are unclear.

Flavonoid production increases promoting insect resistance and superior flower/fruit formation is also observed herein.

UVB exposure that spans the growing day occurs through continuous illumination or period UVB pulses during the day. UVB illumination is either provided separate or in concert with the bulk of the visible PAR.

Figure 6:
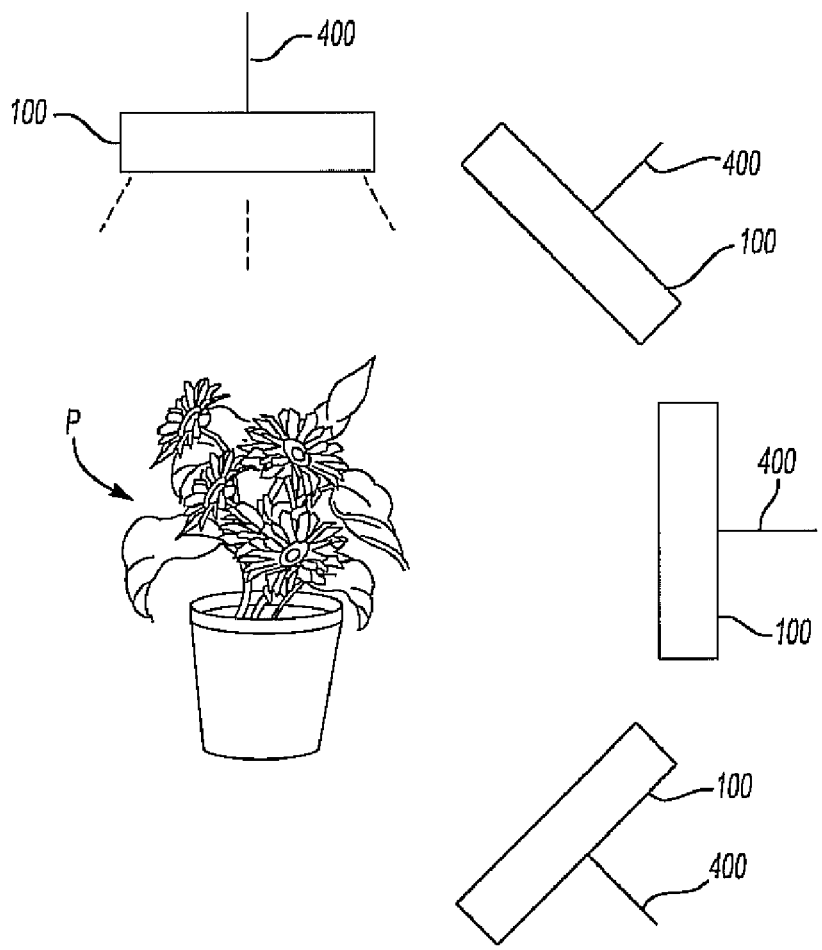
FIG. 6 illustrates the light assembly for an embodiment of the present invention at different locations relative to a plant.

In another embodiment of the system disclosed herein, the light assembly 100 has a positioner 400 in communication therewith. In some instances, the photomorphogenic growth controller 300 is not present within the system, and in other instances the photomorphogenic growth controller 300 is present as part of the system. The positioner 400 affords for positioning of the light assembly 100 in a location or a variety of locations with respect to the plant P as shown in FIG. 6—with the light assembly 100 still facing the plant P. For example, the positioner 400 can position the light assembly 100 directly above the plant P, off to the side of the plant P but generally above it, directly to the side of the plant P, off to the side of die plant P but generally below it and/or any position in between these positions. In this manner the positioner 400 affords for the light assembly 100 to illuminate the plant P from a variety of angle and locations, for example from underneath a canopy of the plant's leaves, flowers and the like.

The positioner 400 can afford for an exact location relative to a reference point (not shown) based on one or more input datum. For example, the positioner 400 can receive one or more input datum regarding the plant growth cycle 410, user input 420, plant environment indicator 430 and/or present position of the light assembly 440. In some instances, the positioner 400 can be a simple cord, rope, chain and the like which affords for the light assembly 100 to hang from a support a given distance from the plant P. In other instances, the positioner 400 affords for the light assembly to be placed at different locations with respect to the plant P as a function of user input, time of day, cumulative time of plant exposure to photon radiation from the light assembly 100, ambient light intensity of the environment surrounding the plant, humidity level of the environment surrounding the plant and/or combinations thereof. In this manner, the light assembly 100 can afford for exposure of a plant that mimics light from the sun, It is appreciated that the system described above can be used to alter stress responses or photomorphogenic properties of a biological material, The photomorphogenic properties altered by the system are optionally defense mechanisms against a pathogen attack, increased levels of UV activating genes, modified gene expression, thickening of fruit skin, altering fruit flavor characteristics, increased production of flavonoids, increased fungal resistance, enhancing pigmentation, increased pigment production, essential oil output, resin output, decreased stem elongation, increased radial growth of flowers, altering architectural properties, post harvestability, increases or decreases in flower numbers, increases in thricome density, decreases in leaf area, altering production of terpenoid, alkaloid, phenolpropanoid or other economically valuable compounds such as pharmaceutics. It is also appreciated that the system can be used to treat the presence of a pathogen attack on plants.

References cited herein are indicative of the level of skill in the art to which the invention pertains. These references are hereby incorporated by reference to the same extent as if each individual reference was explicitly and individually incorporated herein,

REFERENCE LIST

1. Allen, D. J., Nogues, S., Baker, N. R. (1998) Ozone depletion and increased UV-B radiation: is there a threat to photosynthesis. *J Exp Bot* 49:1775-1788.
2. Antignus, Y. (2000) Manipulation of wavelength dependent behaviour of insects: an IPM tool to impede insects and restrict behaviour of insect-borne viruses. *Virus Res.* 71, 213-220.
3. Bacci, L. et al. (1999) UV-B radiation causes early ripening and reduction in size of fruits in two lines of tomato (Lycopersicon esculentum Mill.). *Glob. Change Biol.* 5, 635-646.
4. Ballaré(b), C. L., Scopel, A. L., Stapleton, A. E. and Yanovsky, M. J. 1996. Solar ultraviolet-B radiation affects seedling emergence, DNA integrity, plant morphology, growth rate, and attractiveness to herbivore insects in Datura ferox. *Plant Physiology* 112:161-170.
5. Ballaré, C. L.; Rousseauxa, M. C.; Searles, P. S.; Zaller, J. G.; Giordano, C. V.; Robson, T. M.; Caldwell, M. M.; Sala, O. E.; Scopel, A. L. Impacts of solar ultraviolet-B radiation on terrestrial ecosystems of Tierra del Fuego (southern Argentina) An overview of recent progress. *Journal of Photochemistry and Photobiology B: Biology* 62 (2001) 67-77.
6. Barnes, P. W., Flint, S. D., Caldwell, M. M. (1990) Morphological responses of crop and weed species of different growth forms to ultraviolet-B radiation. *Am J Bot* 77:1354-1360.
7. Barnes, J., K. Percy, N. Paul, P. Jones, C. McLaughlin, P. Mullineaux, G. Creissen and A. Wellburn (1996) The influence of UV-B radiation on the physicochemical nature of tobacco (Nicotiana tabacum L.) leaf surface, *J. Exp. Bot.* 47, 99-109.
8. Bassman, J. H. Ecosystem Consequences of Enhanced Solar Ultraviolet Radiation: Secondary Plant Metabolites as Mediators of Multiple Trophic Interactions in Terrestrial Plant Communities. *Photochemistry and Photobiology,* 2004, 79(5):382-398.
9. Bender, K., Blattner, C., Knebel, A., Lordanov, M., Herrlich, P. and Rahmsdorf, H. J. 1997. UV-induced signal transduction. *Journal of Photochemistry and Photobiology B* 37:1-17.
10. Bothwell, M. L., Sherbot, D. M. J., Pollock, C. M. (1994) Ecosystem responses to solar ultraviolet-B radiation: influence of trophic-level interactions. *Science* 265:97-100.
11. Björn, L. O., Callaghan, T. V., Johnsen, I., Lee, J. A., Manetas, Y., Paul, N. D., Sonesson, M., Wellburn, A. R., Coop, D., Heide-Jorgensen, H. S., Gehrke, C., Gwynn-Jones, D., Johanson, U., kyparissis, A., Levizou, E., Nikolopoulos, D., Petropoulou, Y., Stephanou, M. (1997) The effects of UV-B radiation on European heathland. *Plant Ecol* 128:252-264.
12. Björn, L. O., Widell, S., Wang, T., Evolution of UV-B Regulation and Protection in Plants, *Adv. Space Res.* Vol. 30, No. 6, pp. 1557-1562, 2002.
13. Brosché a, M.; Stridb, A. Molecular events following perception of ultraviolet-B radiation by plants. *Physiologia Plantarum,* 117:1-10, 2003.
14. Brosché, M. et al. (2002) Gene regulation by low level UV-B radiation: identification by DNA array analysis. *Photochem. Photobiol. Sci.* 1, 656-664.
15. Burkhardt, D. (1982) Birds, berries and UV: a note on some consequences of UV vision in birds. Naturwissenschaften 69, 153-157.
16. Briggs, W. R.; Olney, M. A. Photoreceptors in Plant Photomorphogenesis to Date. Five Phytochromes, Two Cryptochromes, One Phototropin, and One Superchrome. *Plant Physiol,* 2001; 125(1):85-8.
17. Britt, A. B. (1999) Molecular genetics of DNA repair in higher plants. *Trends Plant Sci* 4:20-25.

18. Caldwell, M. M.; Flint, S. D.; Searles, P. S.; (1994) Spectral balance and UV-B sensitivity of soybean: a field experiment. *Plant Cell Environ.* 17, 267-276.
19. Caldwell, M. M. et al. (2003) Terrestrial ecosystems, increased solar ultraviolet radiation and interactions with other climatic change factors. *Photochem. Photobiol. Sci.* 1,29-38.
20. Caldwell, M. M., Flint, S. D. (1997) Uses of biological weighting functions and the need of scaling for the ozone reduction problem. *Plant Ecol* 128:66-76.
21. Caasi-Lit, M., M. I. Whitecross, M. Nayudu and G. J. Tanner (1997) UV-B irradiation induces differential leaf damage, ultrastructural changes and accumulation of specific phenolic compounds in rice cultivars. *Aust. J. Plant Physiol.* 24, 261-274.
22. Child, R., and Smith H., (1987). Phytochrome action in light-grown mustard: Kinetics, fluence-rate compensation and ecological significance. *Planta* 172:219-229.
23. Chory, J. and Wu, D. Weaving the Complex Web of Signal Transduction. *Plant Physiol.* 2001; 125(1):77-80.
24. Cockell, C. S.; Southern, A.; Herrera, A. Lack of UV radiation in Biosphere 2—practical and theoretical effects on plants. *Ecological Engineering* 16 (2000) 293-299.
25. Conconi, A. et al. (1996) The octadecanoid signaling pathway in plants mediates a response to ultraviolet radiation. *Nature* 383, 826-829.
26. Cooley, N. M., H. M. F. Truscott, M. G. Holmes and T. H. Attridge (2000) Outdoor ultraviolet polychromatic action spectra for growth responses of Bellis perennis and Cynosurus cristatus. *J. Photochem. Photobiol.* B: Biol. 59, 64-71.
27. Costa, H. S. and Robb, K. L. (1999) Effects of ultraviolet-absorbing greenhouse plastic films on flight behavior of Bemisia argentifolii (Homoptera: Aleyrodidae) and Frankliniella occidentalis (Thysanoptera: Thripidae) *J. Econ. Entomol.* 92, 557-562.
28. Croteau, R., T. M. Kutchan and N. G. Lewis (2000) *Nature products (secondary metabolites)*. In Biochemistry & Molecular Biology of Plants (Edited by B. Buchanan, W. Gruissem and R. Jones), pp. 1250-1318. American Society of Plant Physiologists, Rockville, Md.
29. Day, T. A., Ruhland, C. T., Grobe, C. W., Xiong, F. (1999) Growth and reproduction of Antarctic vascular plants in response to warming and UV radiation reductions in the field. *Oecologia* 119:24-35.
30. Davies, P. J. (1995) Plant Hormones. Kluwer Academic Publishers, Dordrecht, The Netherlands.
31. Döhring, Thorsten; Koefferlein, Matthias; Thiel, Stephan, and Seidlitz, Harald K. Spectral Shaping of Artificial UV-B Irradiation for Vegetation Stress Research. *Journal of Plant Physiology.* 1996; 148(½):115-119.
32. Elena Monte, José M. Alonso, Joseph R. Ecker, Yuelin Zhang, Xin Li, Jeff Young, Sandra Austin-Phillips, and Peter H. Quail, Isolation and Characterization of phyC Mutants in Arabidopsis Reveals Complex Crosstalk between Phytochrome Signaling Pathways. *Plant Cell.* 2003 September; 15(9):1962-1980.
33. Ensminger, P. A. (1993) Control of development in plants and fungi by far-UV radiation. *Physiol. Plant.* 88, 501-508.
34. Fiscus, E. L., Booker, F. L. (1995) Is increased UV-B a threat to crop photosynthesis and productivity? *Photosynth Res* 43:81-92.
35. Franklin, K. A.; Larner, V. S., and Whitelam, G. C. The signal transducing photoreceptors of plants. *Int J Dev Biol.* 2005; 49(5-6):653-64.
36. Fuglevand, G., Jackson, J. A., Jenkins, G, I., 1996. UV-B, UV-A and blue light signal transduction pathways interact synergistically to regulate chalcone synthase gene expression in Arabidopsis. *Plant Cell* 8, 2347-2357.
37. Gatehouse, J. A. (2002) Plant resistance towards insect herbivores: a dynamic interaction. *New Phytol* 156:145-169.
38. Giannini A., Pardossi A., Lercari, B., (1996) The use of UV radiation to control the architecture of Salvia splendens plants. I. Effects on plant growth, water relations and gas exchange. *Photochem Photobiol* 64:123-130.
39. Gitz, D. C.; Liu-Gitz, L. How do UV Photomorphogenic Responses Confer Water Stress Tolerance? *Photochemistry and Photobiology,* 2003, 78(6):529-534.
40. Gilbert, K. G. and Cooke, D. T. (2001) Dyes from plants: past usage, present understanding and potential. *Plant Growth Reg.* 34, 57-69.
41. Grammatikopoulos G., Karousou R., Kokkini S., Manetas Y. (1998). Differential effects of UV-B radiation on reproductive effort in two chemotypes of Mentha spicata under feld conditions. *Austr J Plant Phys* 25:345-351.
42. Gregianini, T. S.; da Silveira, V. C.; Porto, D. D.; Kerber, V. A.; Henriques, A. T., and Fett-Neto, A. G. The alkaloid brachycerine is induced by ultraviolet radiation and is a singlet oxygen quencher. *Photochem Photobiol.* 2003 Nov; 78(5):470-4.
43. Gunasekera, T. S., Paul, N. D. and Ayres, P. G. 1997. The effects of ultraviolet-B (UV-B: 290-320 mn) radiation on blister blight disease of tea (Camellia sinensis). *Plant Pathology* 46:179-185.
44. Halliday, K. J., Koorneef, M., WHitelam G. C., (1994). Phytochrome B and at least one other phytochrome mediate the accelerated flowering response of Arabidopsis thaliana L. to low red/far-red ratio. *Plant Physiol.* 104: 1311-1315.
45. Hajnos, M. K. et al. (2001) The influence of ultraviolet radiation on the content of pharmacologically active taxoids in yew tissues. *Phytomedicine* 8, 139-143.
46. Harbourne, J. B. (1991) *Flavonoid pigments*. In Herbivores: Their Interactions with Secondary Metabolites, 2nd ed. (Edited by G. A. Rosenthal and M. R. Berenbaum), pp. 389-430. Academic Press, San Diego.
47. Hatcher, P. E. and Paul, N. D. 1994. The effect of elevated UV-B radiation on herbivory of pea by Autographa gamma. *Entomologia Experimentalis et Applicata* 71:227-233.
48. Hillig, K. W., Mahlberg, P. G., A Chemotaxonmic, 2004, Analysis of Cannabinoid Variation in Cannabis (Cannacbceae), *American Journal of Botany* 91(6):966-975.
49. Huang, S., Dai, Q., Peng, S., Chavez, A. Q., Miranda, M. L. L., Visperas, R. M. and Vergara, B. S. 1997. Influence of supplemental ultraviolet-B on indoleacetic acid and calmodulin in the leaves of rice (Oryza sativa L.). *Plant Growth Regulation* 21:59-64.
50. Izaguirre, M. M.; Scopel, A. L.; Baldwin, I. T.; Ballaré, C. L. Convergent Responses to Stress. Solar Ultraviolet-B Radiation and Manduca sexta Herbivory Elicit Overlapping Transcriptional Responses in Field-Grown Plants of Nicotiana longiflora. *Plant Physiology,* August 2003, Vol. 132, pp. 1755-1767.
51. Jansen, M. A. K., 2002, Ultraviolet-B radiation effects on plants: induction of morphogenic responses. *Physiologia Plantarum,* 116:423-429.
52. Jenkins, G. I., Fuglevand, G. and Christie, J. M. 1997. *UV-B perception and signal transduction*. In Plants and UV-B: Responses to Environmental Change, P. Lumsden (ed.), Cambridge Univ. Press, UK, pp. 135-156.
53. Johnston, H. S. 1971. Reduction of stratospheric ozone by nitrogen oxide catalysts from supersonic transport exhaust. *Science* 173:517-522.

54. Johnson, C. B. et al. (1999) Substantial UV-B-mediated induction of essential oils in sweet basil (Ocirrzeini basilictiirn L.). *Phytochemistry* 51, 507-510.
55. Jordan, B. R., 1996. The effects of ultraviolet-B radiation on plants: A molecular perspective. *Advances in Botanical Research* 22:97-162.
56. Jordan, B. R., Chow, H. J., Anderson, J. M. (1992) Changes in mRNA levels and polypeptide subunits of ribulose 1:5-bisphosphate carboxylase in response to supplementary ultraviolet-B radiation. *Plant Cell Environ* 15:91-98.
57. Karabourniotis, G., K. Papadopoulos, M. Papamarkou and Y. Manetas (1992) Ultraviolet-B radiation absorbing capacity of leaf hairs. Physiol. *Plant.* 86, 414-418.
58. Karousou, R., Grammatikopoulos, G., Lanaras, T., Manetas, Y., Kokkini, S. 1998. Effects of enhanced UV-B radiation on Mentha spicata essential oil. *Phytochemistry* 49:2273-2277.

The foregoing description is illustrative of particular embodiments of the invention, but is not meant to be a limitation upon the practice thereof. The following claims, including all equivalents thereof, are intended to define the scope of the invention.

We claim:

1. A system for radiating a plant with photon radiation to induce photomorphogenic growth comprising:
    a light assembly operable to generate photon radiation of ultraviolet, visible, and infrared radiation;
    a light transmittive material located between said light assembly and a plant and having an optical transmission point of inflection of between 280 and 320 nanometers;
    a power supply connected to said light assembly, said power supply operable to energize said light assembly;
    a failsafe switch connected to and located between said power supply and said light assembly, said failsafe switch operable to de-energize said light assembly when a safety signal is received by said failsafe switch; and
    a photomorphogenic growth controller connected to said light assembly, said photomorphogenic growth controller operable to selectively energize said light assembly.

2. The system of claim 1, wherein said safety signal is received from an electronic device, said electronic device selected from the group consisting of motion detector, door position detector, window position detector, emergency off switch and combinations thereof.

3. The system of claim 1, wherein said photomorphogenic growth controller selectively energizes said light assembly as a function of a plant growth cycle.

4. The system of claim 1, wherein said photomorphogenic growth controller selectively energizes said light assembly as a function of as function of an input datum, said input datum selected from the group consisting of user input, time of day, cumulative time of plant exposure to photon radiation from said light assembly, ambient light intensity, humidity level and combinations thereof.

5. The system of claim 1, wherein said photomorphogenic growth controller selectively energizes said light assembly to periodically irradiate the plant with ultraviolet B photons during a day.

6. The system of claim 1, wherein said photomorphogenic growth controller selectively energizes said light assembly as a function of a position of said light assembly relative to the plant.

7. The system of claim 6, wherein said position of said light assembly is selected from the group consisting of directly above the plant, off to the side but generally above the plant, directly to the side of the plant, off to the side but generally below the plant and any position therebetween.

8. The system of claim 1, wherein said photomorphogenic growth controller irradiates the plant with ultraviolet B photons independent of visible light photons.

9. The system of claim 1, further comprising a light assembly positioner connected to said light assembly, said light assembly positioner operable to position said light assembly relative to the plant.

10. The system of claim 9, wherein said light assembly positioner is operable to position said light assembly relative to the plant as function of a plant growth cycle.

11. The system of claim 9, wherein said light assembly positioner is operable to position said light assembly relative to the plant as function of an input datum, said input datum selected from the group consisting of user input, time of day, cumulative time of plant exposure to photon radiation from said light assembly, ambient light intensity, humidity level and combinations thereof.

12. A system for radiating a plant with ultraviolet and longer wavelength radiation to induce photomorphogenic growth comprising:
    a light assembly operable to transmit ultraviolet light, visible light and infrared light;
    a light transmittive glass material having a transmissivity with a point of inflection between 280 nanometers and 320 nanometers located between said light assembly and a plant;
    a power supply connected to said light assembly, said power supply operable to energize said light assembly;
    a failsafe switch connected to and located between said power supply and said light assembly, said failsafe switch operable to de-energize said light assembly when a safety signal is received by said failsafe switch; and
    a photomorphogenic growth positioner connected to said light assembly, said photomorphogenic growth positioner operable to position said light assembly at a particular location relative to the plant.

13. The system of claim 12, wherein said safety signal is received from an electronic device, said electronic device selected from the group consisting of motion detector, door position detector, window position detector, emergency off switch and combinations thereof.

14. The system of claim 12, wherein said light assembly positioner is operable to position said light assembly relative to the plant as function of the plant growth cycle.

15. The system of claim 12, wherein said light assembly positioner is operable to position said light assembly relative to the plant as function of an input datum, said input datum selected from the group consisting of user input, time of day, cumulative time of plant exposure to photon radiation from said light assembly, ambient light intensity, humidity level and combinations thereof.

16. The system of claim 12, further comprising a photomorphogenic growth controller connected to said light assembly, said photomorphogenic growth controller operable to selectively energize said light assembly.

17. The system of claim 16, wherein said photomorphogenic growth controller selectively energizes said light assembly as a function of a plant growth cycle.

18. The system of claim 16, wherein said photomorphogenic growth controller selectively energizes said light assembly as a function of a plant environment monitor.

* * * * *